United States Patent [19]
Hain et al.

[11] Patent Number: 6,163,854
[45] Date of Patent: Dec. 19, 2000

[54] SWITCHGEAR CABINET MONITORING INSTALLATION

[75] Inventors: Markus Hain, Dillenburg; Jörg Kreiling, Biebertal, both of Germany

[73] Assignee: Rittal-Werk Rudolf Loh GmbH & Co. KG, Herborn, Germany

[21] Appl. No.: 09/035,524

[22] Filed: Mar. 5, 1998

[30] Foreign Application Priority Data

Mar. 12, 1997 [DE] Germany .......................... 197 10 016

[51] Int. Cl.$^7$ .................................................. G06F 11/00
[52] U.S. Cl. ................................ 714/4; 714/23; 713/321
[58] Field of Search ................................ 714/4, 23, 24, 714/43, 47

[56] References Cited

U.S. PATENT DOCUMENTS

| 5,530,946 | 6/1996 | Bouvier et al. | 714/23 |
| 5,745,391 | 4/1998 | Topor | 713/321 |
| 5,872,565 | 2/1999 | Greaves et al. | 345/328 |

FOREIGN PATENT DOCUMENTS 3514334  5/1989  Germany .

OTHER PUBLICATIONS

Heinrich Styppa: *Schaltschrank–Klimatisierung* [Airconditioning for a Switchgear Cabinet], pp. 34–37, Moderne Industrie, Landsberg/Lech, Germany, 1992.

Thomas Koch: Automatisches Umschalten zweier eigensicherer Datenübertragungskanäle zur Erhöhung der Verfügbarkeit, *Signal+Draht*, 85, pp, 10–12, 1993.

*Primary Examiner*—Ly V. Hua
*Attorney, Agent, or Firm*—Pauley Peterson Kinne & Fejer

[57] ABSTRACT

A switchgear cabinet monitoring installation, wherein a switchgear cabinet has at least one control device for units built-in or units attached to the switchgear cabinet, and at least one server. A rapid detection and reaction to a failure of the network is achieved with each control device and each server being connected via the network with a lead computer, wherein the control devices are coupled through additional connections with the lead computer and via connectors with the servers. In case of a failure of the network, the data exchange between the control devices and the lead computer can be established via the additional connection.

7 Claims, 1 Drawing Sheet

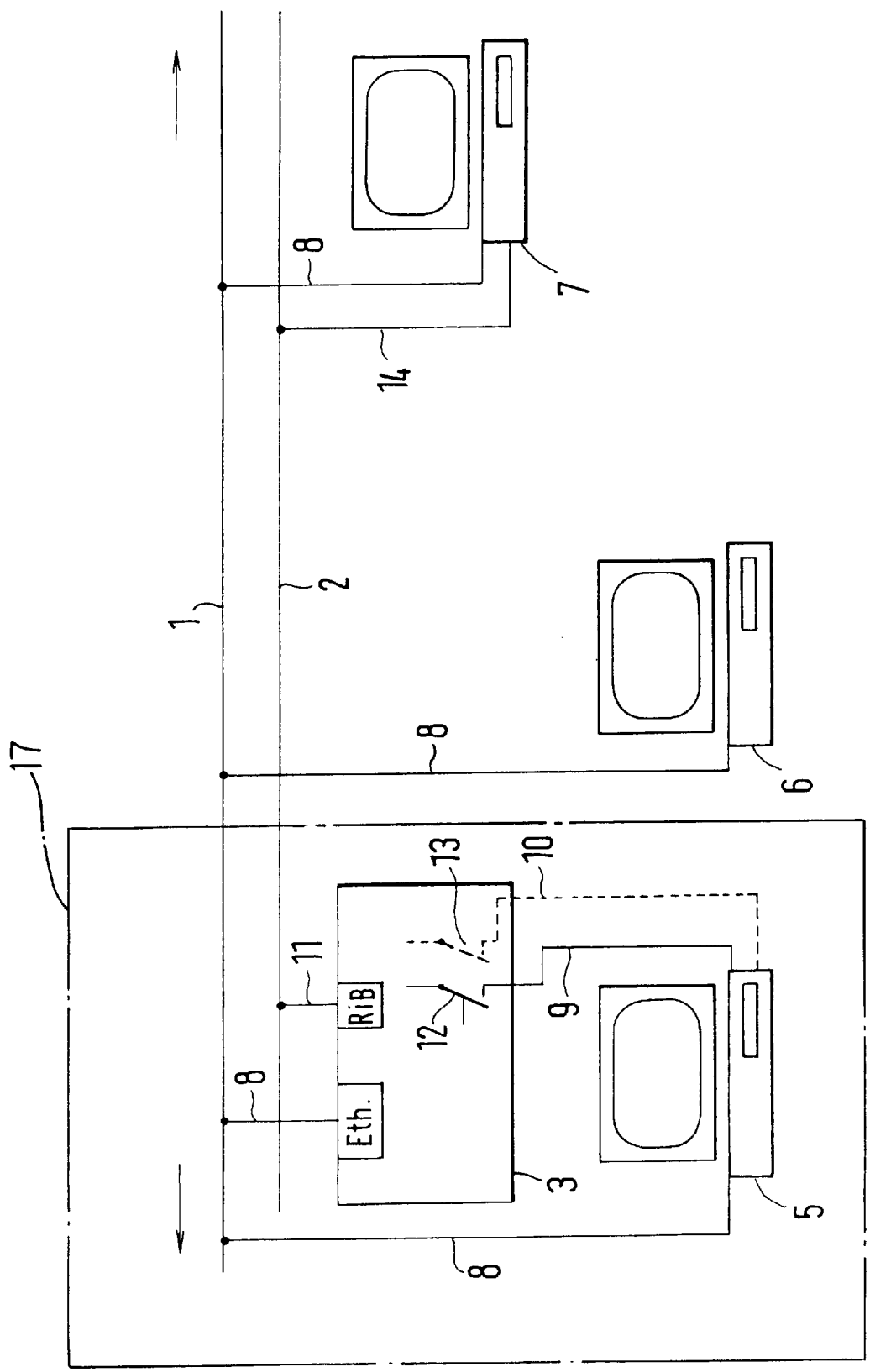

SWITCHGEAR CABINET MONITORING INSTALLATION

BACKGROUND OF THE INVENTION

1. Field of the Invention

This invention relates to a switchgear cabinet monitoring installation, wherein each switchgear cabinet has a control device for units built-in or units attached to the switchgear cabinet, and at least one server.

2. Description of Prior Art

A switchgear cabinet monitoring installation with microcomputer control for the operability of a refrigeration device is described on pages 34 to 37 of a book by Heinrich Styppa, entitled "Schaltschrank-Klimatisierung" [Airconditioning for a Switchgear Cabinet], 1992, Moderne Industrie, publisher, Landsberg/Lech, Germany. The micro-computer control can be integrated into a monitoring installation, such as a central control device or display and information systems. This known monitoring installation is specially designed for monitoring a refrigeration device. No explanation regarding the monitoring of other cabinet built-ins and/or cabinet attachment units is provided in this reference.

SUMMARY OF THE INVENTION

It is one object of this invention to provide a switchgear cabinet monitoring installation which permits the varied monitoring and control of functions, including those of servers installed in the switchgear cabinet.

This object is attained by each control device and each server being connected with a lead computer by a network.

The control devices are coupled via additional connections with the lead computer, and via at least one connector with the servers. Upon network failure, a data exchange between the control devices and the lead computer is possible via the additional connection. In case of network failure, it is possible to affect the server, whose network has failed, by means of the lead computer via the control device.

Several servers are housed in a switchgear cabinet, which are all connected to a control device or, if many functions must be monitored and controlled to several control devices, but not more than one per server. An associated network is formed with a server. It is possible to couple several networks with each other, for example via a gateway. Several such networks, or respectively also switchgear cabinets equipped in this way, can be monitored and controlled by the lead computer.

Various options for the connections provided include the additional connections having a bus connection, an ISDN connection, a telephone line or serial data transmission lines. In this case it is possible to keep the cost for the bus connection small, because the lead computers are only connected with the control devices, and extensive data transmissions between the workstation computers and the servers do not pass through the additional connections. For shorter distances between the lead computer and the individual control devices, serial data transmission lines (RS 232, or respectively V 24) are also suitable, since such interfaces are standardized. An ISDN connection, or respectively telephone line, is suitable for bridging longer distances. Wiring here is relatively simple.

An advantageous design is achieved because the lead computer detects the failure of the network by a detection stage and issues a network failure signal via the additional connection to the control device to which the server, which is a part of the respective network, is connected. Upon receipt of the network failure signal the server can be reset or turned off and back on again via each connector. It is possible by these measures, which make small demands on control technology, to resolve the preponderant number of network failures from the position of the central lead computer.

In this case simple control elements for affecting the server from the control device are achieved by the connectors having an optocoupler or a relay. It is possible to easily provide a reset key of the server which can be parallel bridged by means of the connector, or respectively that the supply network circuit of the servers can be conducted through the control device and can be switched off and on.

It is therefore possible by the steps recited in the main claim and the dependent claims, and as discussed in the following specification to achieve a restart rapidly and simply from a central control location, even in case of a failure of the network.

BRIEF DESCRIPTION OF THE DRAWINGS

This invention will be explained in more detail in what follows by means of an exemplary embodiment, making reference to the drawing.

The single drawing FIGURE schematically represents a monitoring installation for a switchgear cabinet.

DESCRIPTION OF PREFERRED EMBODIMENTS

A switchgear cabinet monitoring installation, wherein a server 5, a control device 3, a workstation computer 6 and a lead computer 7 are coupled to a network 1 by means of respective network connectors 8, is schematically represented in the drawing FIGURE.

Several workstation computers 6 are connected to a network 1 with the server 5. At least one control device 3 for monitoring and controlling several built-in and attached units, as well as several, for example four, servers 5 are housed in a switchgear cabinet indicated by dotted line 17. The control device 3 also has a monitoring and control function for the server 5. With the network 1 ready to function, the control device 3 transmits monitoring data to the lead computer 7 and can also receive control data from the lead computer 7.

In addition to the already provided network 1, the control devices 3 are coupled to the lead computer 7 by means of a connection 2. Furthermore, the server 5 is coupled with the control device 3 via at least one connector. In such embodiment, the connectors are embodied as a reset connector 9 and a supply network circuit 10. The reset connector 9 has a reset element, for example a reset key 12, a relay or an optocotipler, by means of which a reset signal can be delivered to the server 5. It is thus possible to parallel bridge a reset key provided on the server. A switching element 13 for switching the supply network on or off is provided in the supply network circuit.

If a failure of the network 1 is now detected in the detection stage of the lead computer 7, the lead computer 7 issues a network failure signal via a connecting line 14, the additional connection 2 and a further connecting line 11 to the control device, and addresses control information for reacting to the failure of the network 1 to the control device 3. The control device 3 then issues a reset signal to the server 5, so that network operation via the network 1 is again started. Alternatively, it is possible to switch off the supply network of the server 5 by means of the control device 3 and it can be switched on again after a defined time in order to restore the network operation. A relay or an optocoupler, for example, are also possible for use as the reset element, or respectively switching element 13, for issuing a corresponding signal.

In most cases it is therefore possible to restore network operation by means of the control device 3 from the central control location of the lead computer 7 via the additional connection 2. If this is not possible, the operator at the lead computer can be alerted to the uncorrected failure state by means of appropriate information through the display device provided there, and possibly also by means of diagnostic data, and can then correct the failure state at the site.

What is claimed is:

1. A switchgear cabinet monitoring installation comprising: a switchgear cabinet having at least one control device (3) therein for controlling at least one piece of equipment built in or attached to the switchgear cabinet and having at least one server within the switchgear cabinet, the at least one control device (3) and the at least one server (5) being connected with a lead computer (7) via a network (1), the lead computer being located outside of the switchgear cabinet and monitoring a plurality of servers via said network; the at least one control device (3) coupled by additional connections (2, 11, 14) with the lead computer (7) and by at least one connector (9, 10) with the at least one server (5), and in a case of failure of the network (1) a data exchange is established between the at least one control device (3) and the lead computer (7) via the additional connections (2, 11, 14).

2. The switchgear cabinet monitoring installation in accordance with claim 1, wherein the additional connections (2, 11, 14) have one of a bus connection (2), an ISDN connection, a telephone line connection and a serial data transmission line connection.

3. The switchgear cabinet monitoring installation in accordance with claim 2, wherein the lead computer (7) detects the failure of the network (1) by a detection stage and issues a network failure signal via the additional connections (2, 11, 14) to the control device (3) connected with the at least one server (5), and the at least one server can be either reset or switched off and on by the control device (3) via the at least one connector (9, 10) when a network failure signal is received.

4. The switchgear cabinet monitoring installation in accordance with claim 3, wherein the connectors (9, 10) have one of an optocoupler and a relay.

5. The switchgear cabinet monitoring installation in accordance with claim 4, wherein a reset key of the server (5) is parallel bridged by the connector (9).

6. The switchgear cabinet monitoring installation in accordance with claim 4, wherein a supply network circuit connected to the at least one server (5) is conducted through the control device (3), and is switched off and switched on from the control device (3).

7. A switchgear cabinet monitoring installation comprising: a switchgear cabinet having at least one control device (3) for controlling at least one piece of equipment built in or attached to the switchgear cabinet and at least one server within the cabinet, the at least one control device (3) and the at least one server (5) being connected with a lead computer (7) via a network (1), the lead computer being located outside of the switchgear cabinet; the at least one control device (3) coupled by additional connections (2, 11, 14) with the lead computer (7) and by at least one connector (9, 10) with the at least one server (5), and in a case of failure of the network (1), a data exchange between the at least one control device (3) and the lead computer (7) being established via the additional connections (2, 11, 14); and wherein the lead computer (7) detects the failure of the network (1) by a detection stage and issues a network failure signal via the additional connections (2, 11, 14) to the control device (3) connected with the at least one server (5), and the at least one server can be either reset or switched off and on by the control device (3) via the at least one connector (9, 10) when a network failure signal is received.

* * * * *